United States Patent
MacDonald et al.

(10) Patent No.: US 12,160,774 B2
(45) Date of Patent: Dec. 3, 2024

(54) SYSTEM AND METHOD FOR MULTI-PATH DATA TRANSMISSION

(71) Applicant: GM GLOBAL TECHNOLOGY OPERATIONS LLC, Detroit, MI (US)

(72) Inventors: Andrew J. MacDonald, Grosse Pointe Park, MI (US); Venkata Naga Siva Vikas Vemuri, New Hudson, MI (US); Ashhad Mohammed, West Bloomfield, MI (US); Lakshmi V. Thanayankizil, Rochester Hills, MI (US); Eilon Riess, Zikron-Yaakov (IL); Dipankar Pal, Sylvania, OH (US)

(73) Assignee: GM Global Technology Operations LLC, Detroit, MI (US)

(*) Notice: Subject to any disclaimer, the term of this patent is extended or adjusted under 35 U.S.C. 154(b) by 377 days.

(21) Appl. No.: 17/848,826

(22) Filed: Jun. 24, 2022

(65) Prior Publication Data
US 2023/0422100 A1    Dec. 28, 2023

(51) Int. Cl.
  *H04W 28/18*    (2009.01)
  *H04W 28/02*    (2009.01)
  *H04W 28/24*    (2009.01)

(52) U.S. Cl.
  CPC ....... *H04W 28/18* (2013.01); *H04W 28/0268* (2013.01); *H04W 28/24* (2013.01)

(58) Field of Classification Search
  CPC .. H04W 28/18; H04W 28/24; H04W 28/0268
  See application file for complete search history.

(56) References Cited

U.S. PATENT DOCUMENTS

| | | |
|---|---|---|
| 2020/0374216 A1 | 11/2020 | Ganesh et al. |
| 2022/0094748 A1 | 3/2022 | Wang et al. |
| 2022/0295235 A1* | 9/2022 | Wang .............. H04L 1/0008 |

OTHER PUBLICATIONS

Kien Nguyen, et al., "An Approach to Reinforce Multipath TCP with Path-Aware Information", Sensors 2019, 19, 476; doi:10.3390/s19030476, www.mdpi.com/journal/sensors; pp. 1-12; 2019.

* cited by examiner

*Primary Examiner* — Sam Bhattacharya
(74) *Attorney, Agent, or Firm* — Quinn IP Law (57) ABSTRACT

Wireless transmission of data packets between controllers is executed over a plurality of integrated hybrid wireless communication channels, with proportional allocation of communication links for guaranteed and best-effort communication links. Data packets may be communicated across a plurality of wireless communication channels to ensure delivery of on-demand performance.

16 Claims, 5 Drawing Sheets

SYSTEM AND METHOD FOR MULTI-PATH DATA TRANSMISSION

INTRODUCTION

The concepts described herein are generally related to wireless communication between devices in which a plurality of communication paths are available for concurrent transmission of data packets.

Some communication models are unable to consistently achieve a target communication rate for communicating a plurality of data packets to an end-user, resulting in content that is broken, interrupted and uneven, including when delivering paid subscription services.

Furthermore, multi-cellular links may be subject to congestion, further exacerbating inconsistent content.

SUMMARY

There is a need for a hybrid model solution involving multiple wireless technologies to reliably delivering high-quality content to an end-user, especially on systems and devices that are highly mobile, such as motor vehicles.

The concepts described herein provide for concurrent multi-path data transmission between controllers that dynamically employs some form of load balancing to achieve a target communication rate without saturating the data transmission paths.

The concepts described herein further provide for wireless transmission of data packets between controllers that is executed over a plurality of integrated hybrid wireless communication channels with proportional allocation of uplinks and downlinks for guaranteed and best-effort communication links. In this manner, data packets may be proportionally allocated across a plurality of wireless communication channels to ensure delivery of on-demand performance(s), including for commercial or subscriptions services that may be employed on a mobile system such as a motor vehicle.

An aspect of the disclosure includes a system having a first controller that includes a non-transitory computer-readable storage medium having stored therein instructions which, when executed by the first controller, cause the first controller to perform the following operations. The operations include determining a target communication rate for communicating a plurality of data packets between the first controller and the second controller, identifying a plurality of available wireless communication links between the first controller and the second controller, and determining a plurality of communication rates associated with the plurality of available wireless communication links. A proportionate allocation for the plurality of available wireless communication links is determined based upon the target communication rate and the plurality of communication rates associated with the plurality of available wireless communication links. A plurality of concurrent wireless transmissions of the plurality of data packets are executed via the plurality of available wireless communication links and are based upon the proportionate allocation of the plurality of available wireless communication links to achieve the target communication rate.

Another aspect of the disclosure includes the operations executing, via the plurality of available wireless communication links, the plurality of concurrent wireless transmissions of the plurality of data packets based upon the proportionate allocations for the plurality of available wireless communication links to achieve the target communication rate.

Another aspect of the disclosure includes determining a plurality of data transmission costs for the plurality of available wireless communication links; and determining the proportionate allocation of the plurality of available wireless communication links for the plurality of available wireless communication links based upon the target communication rate, the plurality of communication rates associated with the plurality of available wireless communication links, and the plurality of data transmission costs for the plurality of available wireless communication links.

Another aspect of the disclosure includes determining a plurality of data transmission times per packet for the plurality of available wireless communication links; and determining the proportionate allocation of the plurality of available wireless communication links based upon the target communication rate, the plurality of communication rates associated with the plurality of available wireless communication links, and the plurality of data transmission times per packet for the plurality of available wireless communication links.

Another aspect of the disclosure includes determining a plurality of data transmission times per packet for the plurality of available wireless communication links; determining a plurality of data transmission costs for the plurality of available wireless communication links; and determining the proportionate allocation of the plurality of available wireless communication links based upon the target communication rate, the plurality of communication rates associated with the plurality of available wireless communication links, the plurality of data transmission costs for the plurality of available wireless communication links, and the plurality of data transmission times per packet for the plurality of available wireless communication links.

Another aspect of the disclosure includes the plurality of available wireless communication links including a cellular communication link, a WiFi communication link, a LiFi communication link, a radiofrequency communication link, a VLC (video local area network or VLAN) communication link, or an electro-magnetic communication link.

Another aspect of the disclosure includes determining maximum communication rates associated with the plurality of available wireless communication links.

Another aspect of the disclosure includes the maximum communication rates associated with the plurality of available wireless communication links being a guaranteed bit rate for one of the plurality of available wireless communication links.

Another aspect of the disclosure includes the maximum communication rates associated with the plurality of available wireless communication links being a minimum best-effort bit rate for one of the plurality of available wireless communication links.

Another aspect of the disclosure includes executing, via the plurality of available wireless communication links, the plurality of concurrent wireless transmissions to uplink the plurality of data packets to the first controller based upon the proportionate allocation of the plurality of available wireless communication links to achieve the target communication rate.

Another aspect of the disclosure includes executing, via the plurality of available wireless communication links, the plurality of concurrent wireless transmissions to downlink the plurality of data packets from the first controller based upon the proportionate allocation of the plurality of available wireless communication links to achieve the target communication rate.

Another aspect of the disclosure is a method for multi-path data transmission, which includes determining a target communication rate for communicating a plurality of data packets between a first controller and a second controller; identifying a plurality of available wireless communication links between the first controller and the second controller; determining a plurality of communication rates associated with the plurality of available wireless communication links; determining a proportionate allocation of the plurality of available wireless communication links based upon the target communication rate and the plurality of communication rates associated with the plurality of available wireless communication links; and executing, via the plurality of available wireless communication links, a plurality of concurrent wireless transmissions of the plurality of data packets based upon the proportionate allocation of the plurality of available wireless communication links to achieve the target communication rate.

Another aspect of the disclosure includes determining a plurality of data transmission costs for the plurality of available wireless communication links, determining a plurality of quality parameters for the plurality of available wireless communication links, and determining the proportionate allocation of the plurality of available wireless communication links for the plurality of available wireless communication links based upon the target communication rate, the plurality of communication rates, the plurality of data transmission costs, the plurality of quality parameters, and the plurality of data transmission times per packet for the plurality of available wireless communication links.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Furthermore, the disclosure, as illustrated and described herein, may be practiced in the absence of an element that is not specifically disclosed herein.

The use of ordinals such as first, second and third does not necessarily imply a ranked sense of order, but rather may distinguish between multiple instances of an act or structure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "signal" refers to a physically discernible indicator that conveys information, such as a data packet, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

Figure 1:
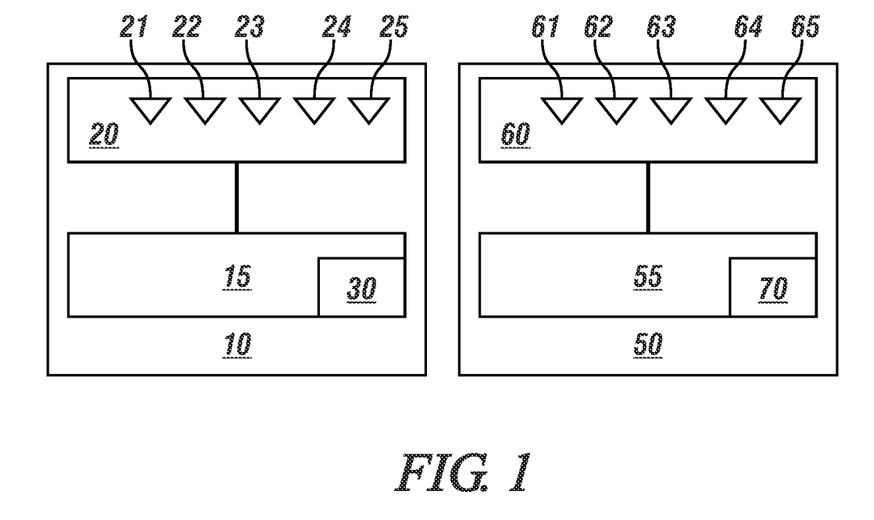
FIG. 1 pictorially illustrates a wireless communication system including a first device having a first controller in communication with a first antenna array and a second device having a second controller in communication with a second antenna array, in accordance with the disclosure.

Referring to the drawings, wherein like reference numerals are used to identify like or identical components in the various views, FIG. 1 schematically depicts a first device 10 including a first controller 15 and a first antenna array 20, and a second device 50 including a second controller 55 and a second antenna array 60, wherein the first device 10 is arranged to wirelessly communicate with other devices, including, e.g., the second device 50. In one embodiment, the first device 10 is a telematics device that is affixed onto a vehicle, which may include, but is not limited to, a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

Wireless communication between devices includes conveying signals in the form of one or a stream of data packets. Data may be segmented into multiple data packets for transmission, with the data packets being reassembled upon reaching the destination. A packet has a header and a payload. The header keeps overhead information about the packet, the service, and other transmission-related data. For example, data transfer over the Internet requires breaking down the data into IP packets, which is defined in IP (Internet Protocol), and an IP packet includes: a source IP address, which is the IP address of the machine sending the data; a destination IP address, which is the machine or device to which the data is sent; a sequence number of the packets, a number that puts the packets in order such that they are reassembled in a way to get the original data back exactly as it was prior to transmission; a type of service; flags; and a payload, which represents the bulk of the packet (all the above is considered as overhead), and is actually the data being carried. A data packet may also be referred to as a datagram, a segment, a block, a cell or a frame, depending on the protocol used for the transmission of data.

The first antenna array 20 is composed as a plurality of antennas that are configured to execute wireless communication, including, in one embodiment, a cellular antenna 21, a WiFi antenna 22, a LiFi antenna 23, a radiofrequency antenna 24, and a second antenna 25. The second antenna 25 may be configured as a second cellular antenna, a second WiFi antenna, a second LiFi antenna, or a second radiofrequency antenna. The plurality of antennas may provide one or a plurality of communication links between the first device 10 and another device, e.g., second device 50. The term "LiFi" is derived from the phrase "light fidelity", and is a bidirectional wireless system that transmits data via LED or infrared light. The term "WiFi" is derived from the phrase "wireless fidelity", and is a family of wireless network protocols, based on the IEEE 802.11 family of standards, and is used for local area networking of electronic devices such as cell phones, computers, etc. The cellular antenna 21 may be capable of one or more of the following communication protocols: 4G, 4G LTE, 5G, 6G, etc.

One or more of the plurality of antennas of the first antenna array 20 described herein may be absent in some embodiments of the first antenna array of the first device 10. Stated differently, some embodiments of the first antenna array 20 of the first device 10 may include a subset of the cellular antenna 21, WiFi antenna 22, LiFi antenna 23, radiofrequency antenna 24, and the second antenna 25.

The second antenna array 60 is composed of a plurality of antennas configured to execute wireless communication, including, in one embodiment, one or more of a cellular antenna 61, a WiFi antenna 62, a LiFi antenna 63, a radiofrequency antenna 64, and another antenna 65. One or more of the plurality of antennas of the second antenna array 60 described herein may be absent in some embodiments of the second antenna array of the second device 50. Stated differently, some embodiments of the second antenna array 60 of the second device 50 may include a subset of the cellular antenna 61, WiFi antenna 62, LiFi antenna 63, radiofrequency antenna 64, and the other antenna 65.

The first controller 15 includes a non-transitory computer-readable storage medium (memory device) 30 having a plurality of instructions stored therein, which, when executed, cause the first controller 15 to perform specific operations. Exemplary instructions include algorithms 200, 300, 320, 340, 360 and 380, which are described with reference to FIGS. 2, 3, 4, 5, 6, and 7, respectively.

The first controller 15 may be composed to include read only memory (ROM) and random access memory (RAM), processor-executable instructions and one or more processors that execute the processor-executable instructions, including the memory device 30. In embodiments where the first controller 15 includes two or more processors, the processors may operate in a parallel or distributed manner. The first controller 15 may also execute an operating system of the first device 10.

In like manner, the second controller 55 includes a non-transitory computer-readable storage medium 70 having a plurality of instructions stored therein, and other memory, including e.g., read only memory (ROM) and random access memory (RAM), processor-executable instructions and one or more processors that execute the processor-executable instructions.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event.

The concepts described with reference to FIGS. 2-7, with continued reference to the first device 10, first controller 15, and first antenna array 20 of FIG. 1, provide various aspects and details related to executing instructions stored on the memory device 30 of the first controller 15 to effect communication.

The first controller 15 executes the instructions stored in the memory device 30 to perform operations that include determining a target communication rate for communicating a plurality of data packets between the first controller 15 and the second controller 55, identifying a plurality of available wireless communication links between the first controller 15 and the second controller 55, and determining a plurality of communication rates associated with the plurality of available wireless communication links. The wireless communication links are defined by the plurality of antennas of the first antenna array 20.

A proportionate allocation of the plurality of available wireless communication links is determined based upon the target communication rate and the plurality of communication rates associated with the plurality of available wireless communication links. A plurality of concurrent wireless transmissions of the plurality of data packets are executed via the plurality of available wireless communication links and are based upon the proportionate allocation of the plurality of available wireless communication links to achieve the target communication rate.

The target communication rate for communicating data packets between the first controller 15 and the second controller 55 is described and defined as a minimum guaranteed bit rate (GBR) for communicating data packets in a manner that is acceptable to the client. In one embodiment, the minimum GBR is based on a 5QI standard for cellular, or is a minimum best-effort bit rate that is defined as a quasi-QOS for Best Effort. In one embodiment, the target communication rate is a guaranteed minimum GBR, a best effort GBR, or some other measurable target communication rate.

Overall, the system described herein includes first controller 15 that executes the following instructions. Initially, a target communication rate for communicating a plurality of data packets between the first controller and a second controller is determined, and a plurality of available wireless communication links between the first controller and the second controller are identified. A plurality of communication rates associated with the plurality of available wireless communication links are also determined. A proportionate allocation of the plurality of available wireless communication links is determined based upon the target communication rate and the plurality of communication rates associated with the plurality of available wireless communication links; and a plurality of concurrent wireless transmissions of the plurality of data packets are executed via the plurality of available wireless communication links based upon the proportionate allocation of the plurality of available wireless communication links to achieve the target communication rate. This is detailed with reference to FIGS. 2, 3, 4, 5, 6, and 7, which describe and detail algorithms 200, 300, 320, 340, 360 and 380, respectively.

Figure 2:
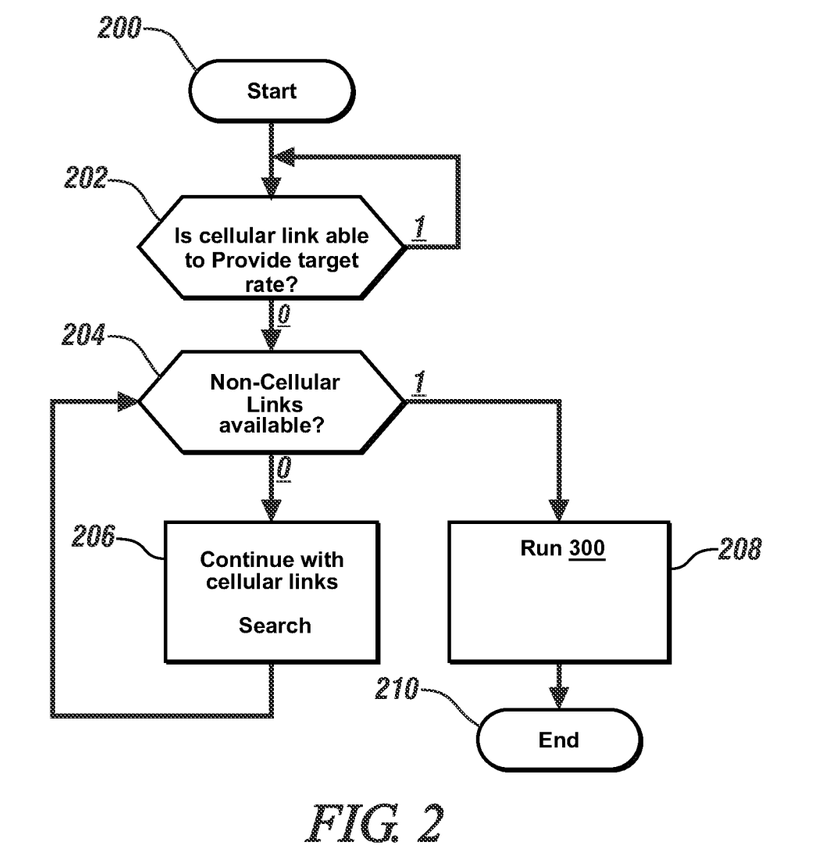
FIG. 2 schematically illustrates a first algorithm that is executable in the first device to evaluate availability of multi-channel communication links, in accordance with the disclosure.

Referring now to FIG. 2, details related to a first algorithm 200 for evaluating availability of multi-channel communication links is illustrated as a collection of blocks in a logical flow graph, and represents a sequence of operations that may be implemented in hardware, software, or a combination thereof. The first algorithm 200 may reside in the memory device 30 of the first controller 15 of the first device 10, and be executable in the first controller 15. In the context of software, the blocks represent computer instructions that, when executed by one or more processors, perform the recited operations. For convenience and clarity of illustration, the method is described with reference to the first device 10 shown in FIG. 1. Table 1 is provided as a key wherein the numerically labeled blocks and the corresponding functions are set forth as follows.

TABLE 1

| BLOCK | BLOCK CONTENTS |
| --- | --- |
| 202 | Is cellular link able to provide target communication rate? |
| 204 | Are non-cellular links available? |
| 206 | Continue and search |
| 208 | Execute multi-channel linking |

Execution of the first algorithm 200 may proceed as follows. The steps may be executed in a suitable order, and are not limited to the order described with reference to FIG. 2. As employed herein, the term "1" indicates an answer in the affirmative, or "YES", and the term "0" indicates an answer in the negative, or "NO".

Initially, the first device 10 establishes a communication link with the second device 50 by having the cellular antenna 21 for the first device 10 link to the cellular antenna 61 of the second device 50. Concurrently, the first device 10 determines a target communication rate for communicating a plurality of data packets that compose a message, which may be in the form of a video, a graphic, etc.

The cellular communication link is periodically evaluated to determine whether the cellular communication link is able to provide communication at the target communication rate (Step 202), and if so, this iteration of the first algorithm 200 ends without further action (202)(1).

When the first controller 15 is unable to establish a cellular communication link that operates at the target communication rate (202)(0), the first algorithm 200 determines whether the first controller 15 and first antenna array 20 are able to establish one or multiple other communication links, e.g., via one or more of the WiFi antenna 22, the LiFi antenna 23, the radiofrequency antenna 24, and the second antenna 25 (Step 204). If not (204)(0), communication continues employing the cellular antenna 21 for the first device 10, while continuing to determine if one or multiple others of the communication links are available (Step 206).

When the first controller 15 and first antenna array 20 are able to establish one or multiple other communication links, e.g., via one or more of the WiFi antenna 22, the LiFi antenna 23, the radiofrequency antenna 24, and the second antenna 25 (204)(1), a performance/linking algorithm 300 is executed (Step 208), and this iteration ends (Step 210). Elements and details of the performance/linking algorithm 300 are described with reference to FIGS. 3-7.

Figure 3:
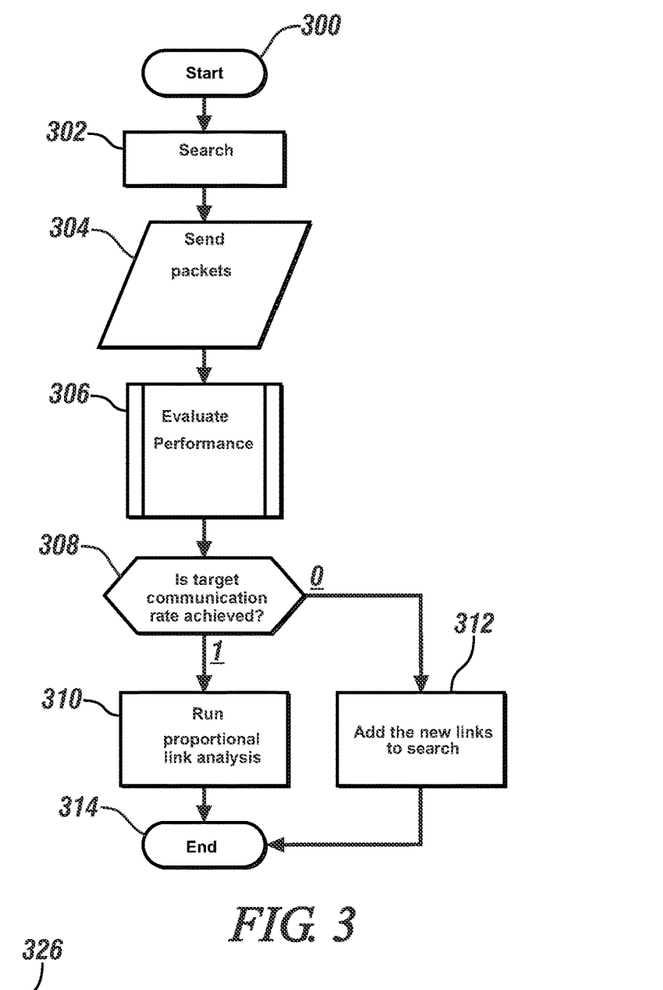
FIG. 3 schematically illustrates a performance/linking algorithm that is executable to proportionately allocate the plurality of available wireless communication links to achieve a target communication rate, in accordance with the disclosure.

Referring now to FIG. 3, details related to an embodiment of the performance/linking algorithm 300 to proportionately allocate the plurality of available wireless communication links to achieve a target communication rate are illustrated. The performance/linking algorithm 300 is depicted as a collection of blocks in a logical flow graph, and represents a sequence of operations that may be implemented in hardware, software, or a combination thereof. In the context of software, the blocks represent computer instructions that, when executed by one or more processors, perform the recited operations. For convenience and clarity of illustration, this is described with reference to the first device 10 shown in FIG. 1. Table 2 is provided as a key wherein the numerically labeled blocks and the corresponding functions are set forth as follows.

TABLE 2

| BLOCK | BLOCK CONTENTS |
| --- | --- |
| 302 | Detect and identify available communication links |
| 304 | Determine communication rate for each available communication link |
| 306 | Evaluate performance of added communication links |
| 308 | Is target communication rate achieved with multiple communication links? |
| 310 | Execute proportional link analysis; Implement proportional link communication using available communication links |
| 312 | Communicate using available communication links, continue search |
| 314 | End |

Execution of the performance/linking algorithm 300 may proceed as follows. The steps may be executed in a suitable order, and are not limited to the order described with reference to FIG. 3. As employed herein, the term "1" indicates an answer in the affirmative, or "YES", and the term "0" indicates an answer in the negative, or "NO".

The routine 300 starts by evaluating the communication links to detect and identify available communication links between the first device 10 and the second device 50, in addition to or in place of a cellular link that is achieved via cellular antenna 21 (Step 302). When one or more communication links is identified as being available for communication between the first device 10 and the second device 50, each of the available communication links is evaluated to determine a communication rate for the respective communication link (Step 304). This may include sending one or multiple test data packets for a preset period of time to determine the communication performance rate for each of the available communication links, especially the recently identified communication links.

A total communication rate may be determined based upon a compilation of the communication rates of the available communication links (Step 306).

When the total communication rate is less than the target communication rate (Step 308)(0), the recently identified communication links may be added to the communication profile to effect communication, searching continues to identify, detect, and evaluate available communication links (Step 312), and this iteration ends (Step 314).

When the total communication rate is greater than the target communication rate (Step 308)(1), the recently identified communication links are subjected to a proportional link analysis to determine a proportionate allocation of the plurality of available wireless communication links to achieve the target communication rate, which is based upon the target communication rate and the plurality of communication rates associated with the plurality of available communication links (Step 310).

Proportionate allocation of the plurality of available communication links is based upon the target communication rate and the plurality of communication rates associated with the plurality of available communication links.

Proportionate allocation is defined as allocating or dividing the communication of a plurality of data packets in a manner that ensures that each of the plurality of available wireless communication links carries a proportionate part of the total communication load, i.e., the target communication rate, to communicate the data packets.

By way of a non-limiting example, for a target communication rate of 100 MBps, a first communication link designated "A" has a maximum communication rate of 50 MBps, a second communication link designated "B" has a maximum communication rate of 75 MBps, and a third communication link designated "C" has a maximum communication rate of 100 MBps. Therefore, a total communication link capability of 225 MBps is available to achieve the target communication rate of 100 MBps. The proportionate allocation for communicating a plurality of data packets includes, in one embodiment, communicating via link A at a rate of 50*100/225 MBps (22.2%), communicating via link B at a rate of 75*100/225 MBps (33.3%), and communicating via link C at a rate of 100*100/225 (44%). In this manner, the communication links are less vulnerable to congestion that if one or more of the communication links was called upon to operate at close to 100% of their available communication capacity.

Subsequent to determining the proportionate allocation for the available communication links described in Steps 302-314, the performance/linking algorithm 300 continues to evaluate performance of the available communication links, as described with reference to Steps 320-332, which are illustrated with reference to FIG. 4.

Figure 4:
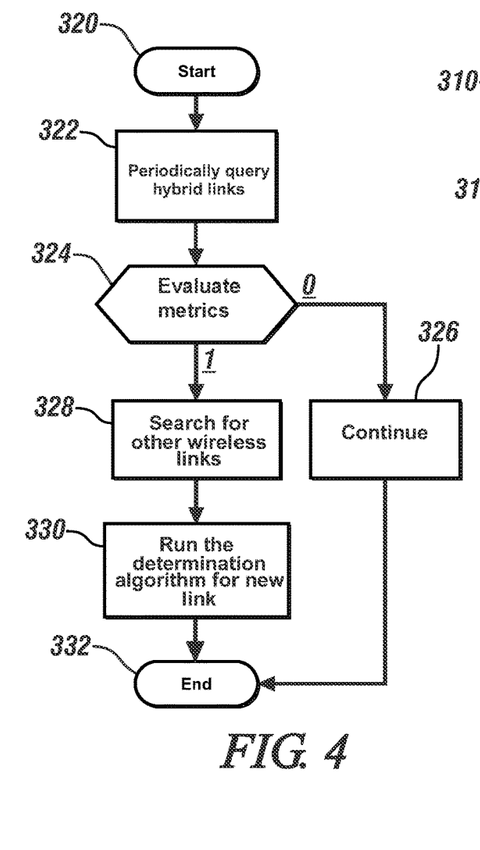
FIG. 4 schematically illustrates a continuation of the performance/linking algorithm to evaluate performance of the available communication links, in accordance with the disclosure.

FIG. 4 schematically illustrates a continuation of the performance/linking algorithm 300 to evaluate performance of the available communication links. For convenience and clarity of illustration, this is described with reference to the first device 10 shown in FIG. 1. Table 3 is provided as a key wherein the numerically labeled blocks and the corresponding functions are set forth as follows.

TABLE 3

| BLOCK | BLOCK CONTENTS |
|---|---|
| 320 | Review |
| 322 | Periodically query available communication links for performance metrics |
| 324 | Evaluate performance metrics |
| 326 | Continue operation |
| 328 | Identify other viable communication links |
| 330 | Re-execute Steps 304-314 |
| 332 | End |

Execution of the review algorithm 320 may proceed as follows. The steps may be executed in a suitable order, and are not limited to the order described with reference to FIG. 4. As employed herein, the term "1" indicates an answer in the affirmative, or "YES", and the term "0" indicates an answer in the negative, or "NO".

Each of the available communication links is periodically queried to determine communication performance metrics (Step 322), which are evaluated (Step 324). When the performance metrics of the available communication links has not deteriorated (324)(0), the present proportionate allocation of the plurality of communication links is maintained, i.e., is not subject to change (326), and this iteration ends (332).

When the performance metrics of the available communication links has deteriorated by an amount that affects communication quality (324)(1), others of the wireless links are searched for (Step 328), and evaluated following the process set forth in Steps 304 to 314 that are described in FIG. 3 (Step 330). The updated proportionate allocation that is determined from Steps 304 to 314 is implemented, and this iteration ends (332).

Figure 5:
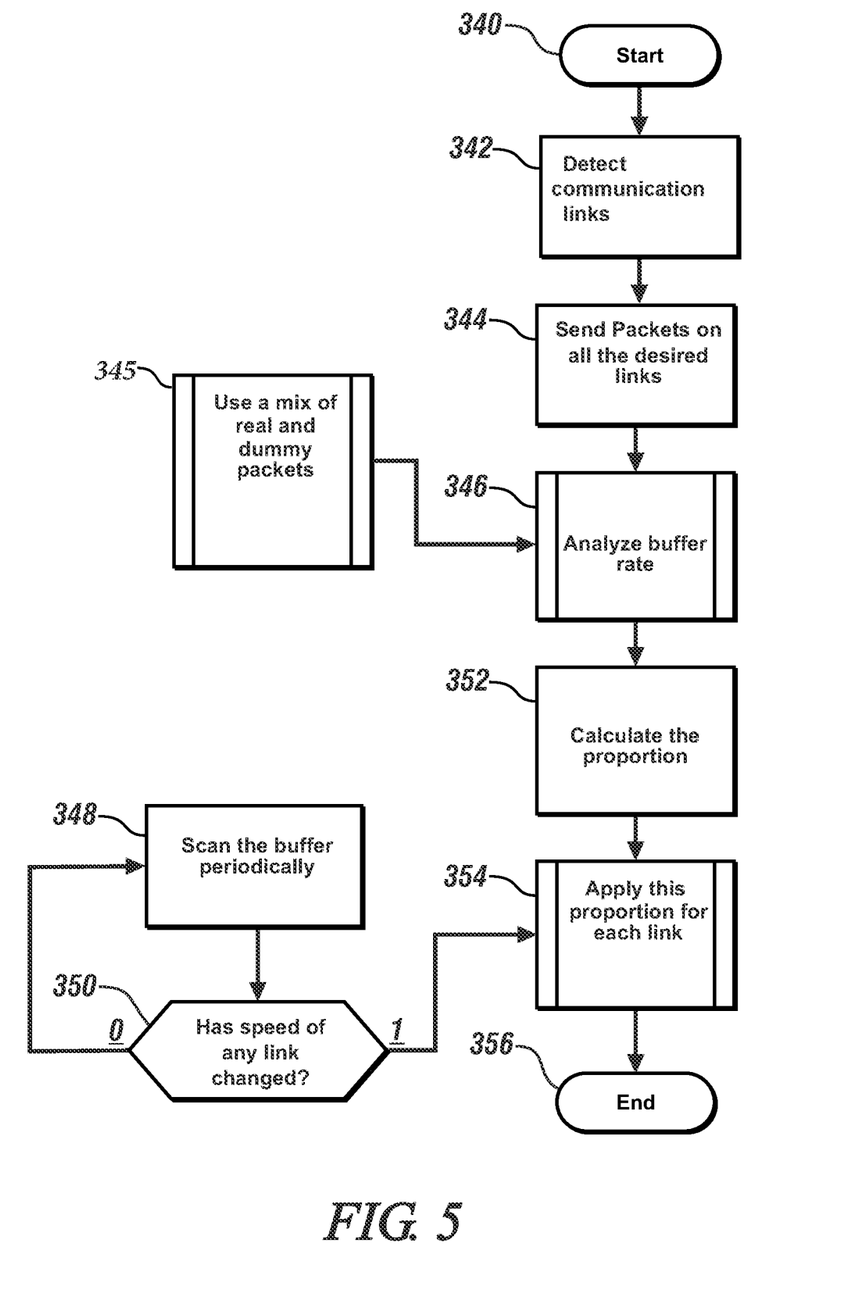
FIG. 5 schematically illustrates an uplink performance/linking algorithm for up-linking data to the first device, in accordance with the disclosure.

Referring now to FIG. 5 with continued reference to the system that is described with reference to FIG. 1, details related to an embodiment of an uplink performance/linking algorithm 340 for up-linking data to an embodiment of the first device 10 are described. The uplink performance/linking algorithm 340 is illustrated as a collection of blocks in a logical flow graph, and represents a sequence of operations that may be implemented in hardware, software, or a combination thereof. In the context of software, the blocks represent computer instructions that, when executed by one or more processors, perform the recited operations. Table 4 is provided as a key wherein the numerically labeled blocks and the corresponding functions are set forth as follows.

TABLE 4

| BLOCK | BLOCK CONTENTS |
|---|---|
| 342 | Detect and identify available communication links |
| 344 | Send packets for each available communication link |
| 345 | Send mix of dummy packets and real packets for video |
| 346 | Analyze buffer rate to determine uplink communication rate for each available communication link |
| 348 | Periodically scan buffer |
| 350 | Detect change in uplink communication rate for each available communication link |
| 352 | Execute proportional link analysis; |

TABLE 4-continued

| BLOCK | BLOCK CONTENTS |
| --- | --- |
|  | determine proportionate allocation for available communication links |
| 354 | Implement communication using available communication links and proportionate allocation |
| 356 | Uplink using available communication links, continue search, end |

Execution of the uplink performance/linking algorithm 340 may proceed as follows. The steps may be executed in a suitable order, and are not limited to the order described with reference to FIG. 5. As employed herein, the term "1" indicates an answer in the affirmative, or "YES", and the term "0" indicates an answer in the negative, or "NO".

The uplink performance/linking algorithm 340 evaluates the communication links to detect and identify available communication links between the first device 10 and the second device 50. The available communication links are in addition to or in place of a cellular link that is achieved via cellular antenna 21 (Step 342). When one or more communication links is identified as being available for communication between the first device 10 and the second device 50, each of the available communication links is evaluated to determine a communication rate for the respective communication link (Step 344). This may include sending one or multiple test data packets for a preset period of time to determine the communication performance rate for each of the available communication links, especially the recently identified communication links.

When the plurality of uplink data packets is a video stream, the test data packets may include real video packets mixed with dummy packets (Step 345).

Buffer rates for the first device 10 are monitored to determine communication rates for the available communication links (Step 346).

A total communication rate is determined based upon the communication rates of the available communication links, and a proportionate allocation may be determined for the identified communication links (Step 352). This analysis is analogous to the proportionate allocation determination that is described with reference to FIG. 3.

Furthermore, the uplink buffer of the first device 10 is periodically scanned and evaluated (Step 348) to detect a substantial change in uplink communication rate for each of the available communication links (Step 350). When a change in the uplink communication rate for one of the available communication links is detected (350)(1), this information is employed to update the total communication rate, and also to update the proportionate allocations for the available communication links (Step 352).

The proportionate allocations for the available communication links are applied to manage the uplink of data packets to the first device 10 from the second device 50 (Step 354), and uplink of data packets to the first device 10 is implemented using the available communication links, and this iteration ends (Step 356).

Figure 6:
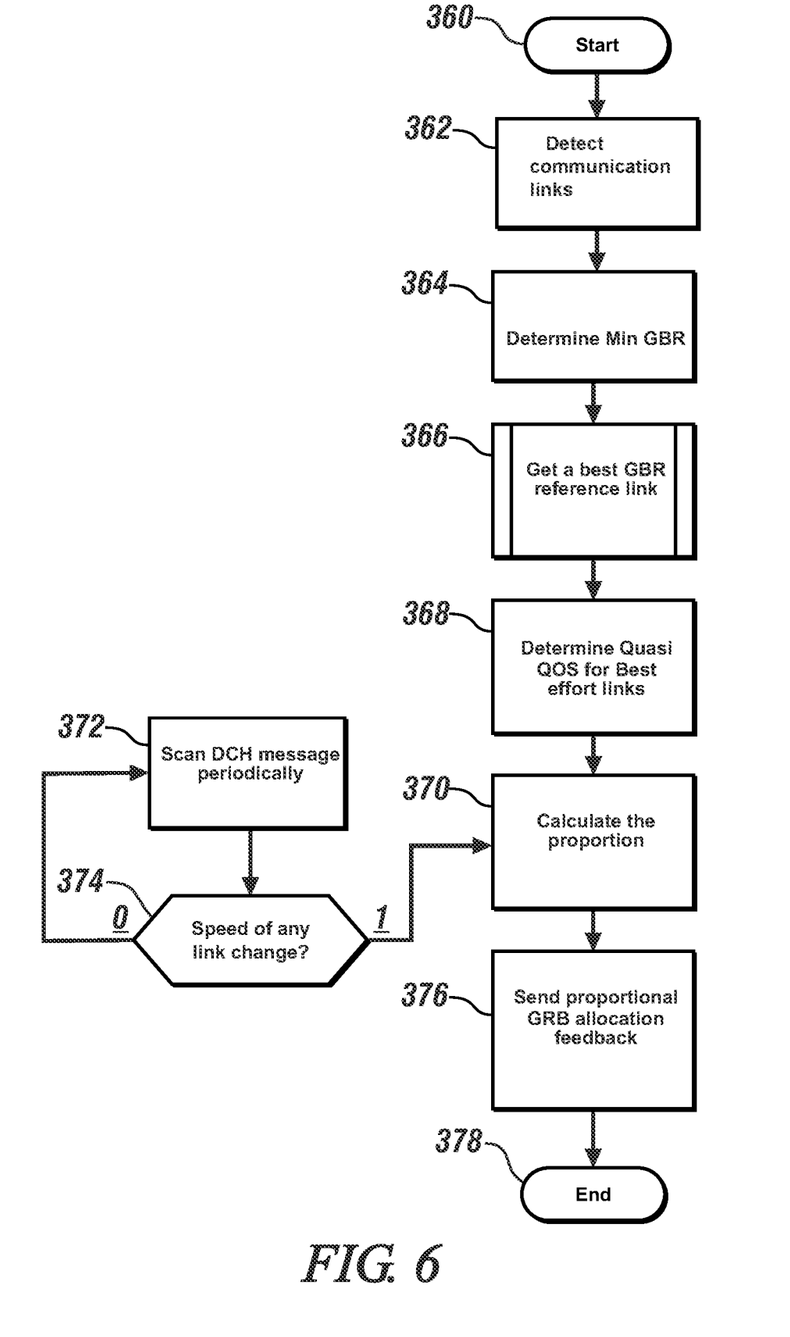
FIG. 6 schematically illustrates a downlink performance/linking algorithm for down-linking data to the first device, in accordance with the disclosure.

Referring now to FIG. 6 with continued reference to elements that are described with reference to FIG. 1, details related to an embodiment of a downlink performance/linking algorithm 360 are provided. The downlink performance/linking algorithm 360 may be employed to downlink data from an embodiment of the first device 10 to a second device, e.g., an embodiment of the second device 50 that is described with reference to FIG. 1. The downlink performance/linking algorithm 360 is illustrated as a collection of blocks in a logical flow graph, and represents a sequence of operations that may be implemented in hardware, software, or a combination thereof. In the context of software, the blocks represent computer instructions that, when executed by one or more processors, perform the recited operations. Table 5 is provided as a key wherein the numerically labeled blocks and the corresponding functions are set forth as follows.

TABLE 5

| BLOCK | BLOCK CONTENTS |
| --- | --- |
| 362 | Detect and identify available communication links |
| 364 | Send packets for each available communication link |
| 366 | Determine best communication rate for the available communication links |
| 368 | Determine Quasi-QOS for Best Effort |
| 370 | Execute proportional link analysis; determine proportionate allocation for available communication links |
| 372 | Scan DCH message to determine variation |
| 374 | Detect change in communication rate for the available communication links |
| 376 | Send |
| 378 | Downlink using available communication links, continue search; end |

Execution of the downlink performance/linking algorithm 360 may proceed as follows. The steps may be executed in a suitable order, and are not limited to the order described with reference to FIG. 5. As employed herein, the term "1" indicates an answer in the affirmative, or "YES", and the term "0" indicates an answer in the negative, or "NO".

The downlink performance/linking algorithm 360 evaluates the communication links to detect and identify available communication links between the first device 10 and the second device 50. The available communication links are in addition to or in placof a cellular link that is achieved via cellular antenna 21 (Step 362). When one or more communication links is identified as being available for communication between the first device 10 and the second device 50, eh of the available communication links is evaluated to determine a communication rate for the respective communication link during downlink operation, and a minimum value for the communication rate is determined (Step 364).

The best communication rate for the available communication links may be determined (Step 366), including determining a communication performance rate for each of the available communication links such as a Quasi QoS for Best Effort parameter for each of the available communication links (Step 368). This may include sending one or multiple test data packets for a preset period of time to determine the communication performance rate for each of the available communication links, especially the recently identified communication links. The minimum value for the communication rate may be determined based upon an existing standard, e.g., a 5QI standard for cellular communication. This includes determining an anticipated Quality of Service (QoS), which includes one or multiple metrics related to the ability of the network to provide an uplink or a downlink at an assured level of performance, including objective estimates of video quality for an end user. QoS characteristics include, e.g., priority level, packet delay, packet error rate, etc. A Quasi QoS for Best Effort is a QoS model where the packets all receive the same priority, and there is no guaranteed delivery of packets. Best Effort is applied when networks have not configured QoS policies or when the infrastructure does not support QoS. In this manner, the speed and quality of service of each of the available downlink communication links may be determined.

A total communication rate is determined based upon the communication rates of the available communication links, and a proportionate allocation may be determined for the identified communication links (Step 370). This analysis is analogous to the proportionate allocation determination that is described with reference to FIG. 3.

Furthermore, a DCH message of the first device 10 is periodically scanned and evaluated (Step 372) to detect a substantial change in downlink communication rate for each of the available communication links (Step 374). When a change in the downlink communication rate for one of the available communication links is detected (374)(1), this information is employed to update the total communication rate, and also to update the proportionate allocations for the available communication links (Step 370).

The proportionate allocations for the available communication links are provided as feedback to the first device 10 and applied to manage the downlink of data packets to the first device 10 from the second device 50 (Step 376), and downlink of data packets to the first device 10 is implemented using the available communication links, and this iteration ends (Step 378).

Figure 7:
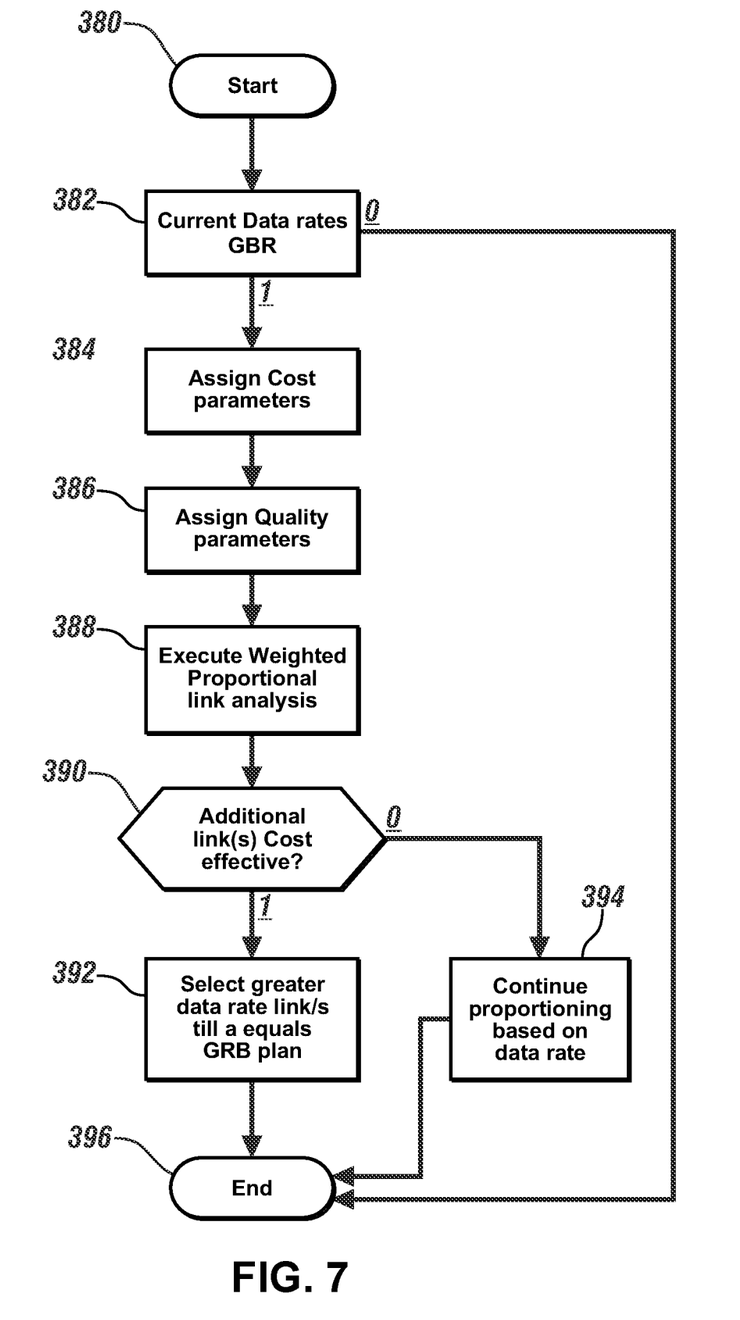
FIG. 7 schematically illustrates a weighted performance/linking algorithm for communicating data between a first device and a second device, in accordance with the disclosure.

Referring now to FIG. 7 with continued reference to the system that is described with reference to FIG. 1, details related to an embodiment of a weighted performance/linking algorithm 380 for communicating data between an embodiment of the first device 10 and an embodiment of the second device 50 are described. The weighted performance/linking algorithm 380 is illustrated as a collection of blocks in a logical flow graph, and represents a sequence of operations that may be implemented in hardware, software, or a combination thereof. In the context of software, the blocks represent computer instructions that, when executed by one or more processors, perform the recited operations. Table 6 is provided as a key wherein the numerically labeled blocks and the corresponding functions are set forth as follows.

TABLE 6

| BLOCK | BLOCK CONTENTS |
| --- | --- |
| 382 | Evaluate current data rate (GBR) |
| 384 | Assign cost parameter to each available communication link |
| 386 | Assign quality parameter to each available communication link |
| 388 | Execute proportional link analysis using cost and/or quality parameters; determine weighted proportionate allocation for available communication links using cost and/or quality parameters |
| 390 | Is use of additional communication link cost-effective? |
| 392 | Implement communication using available communication links and weighted proportionate allocation |
| 394 | Implement communication using available communication links and unweighted proportionate allocation |
| 396 | End |

Execution of the weighted performance/linking algorithm 380 may proceed as follows. The steps may be executed in a suitable order, and are not limited to the order described with reference to FIG. 7. As employed herein, the term "1" indicates an answer in the affirmative, or "YES", and the term "0" indicates an answer in the negative, or "NO".

Initially, the current data transmission rate is compared to a target communication rate for communicating data packets between the first controller 15 and the second controller 55 (Step 382). When the current data transmission rate is greater than the target communication rate (382)(0), this iteration ends (Step 396).

When the current data transmission rate is less than the target communication rate (382)(1), cost parameters and/or quality parameters are assigned to each of the available communication links (Steps 384, 386), and a proportional link analysis is executed using the cost and/or quality parameters for each of the available communication links to determine a weighted proportionate allocation for the available communication links (Step 388).

Assigning cost parameters for each of the available communication links includes determining and assigning real costs incurred by using specific ones of the available communication links.

Assigning quality parameters for each of the available communication links includes determining and assigning signal losses and signal quality parameters that may be incurred by using specific ones of the available communication links.

The weighted proportionate allocation for the available communication links is evaluated to determine if the use of additional communication links is cost-effective (Step 390).

When the use of additional communication links is not cost-effective (390)(0), the system operates employing an unweighted proportionate allocation for the available communication links (Step 394), and this iteration ends (Step 396).

When the use of additional communication links is cost-effective (390)(1), the system operates employing the weighted proportionate allocation for the available communication links (Step 392), and this iteration ends (Step 396).

This arrangement to proportionately allocate uplink and downlink wireless communication using available communication links serves to reduce congestion on the available communication links, provides a mechanism to regularly manage and empty data buffers in the controllers, improve parameters such as GBR in the available communication links, and provides overall improved wireless communication.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative and not as limiting.

What is claimed is:

1. A system, comprising:
a first controller;
the first controller including a non-transitory computer-readable storage medium having stored therein instructions which, when executed by the first controller, cause the first controller to perform operations, the instructions comprising:
determine a target communication rate for communicating a plurality of data packets between the first controller and a second controller;
identify a plurality of available wireless communication links between the first controller and the second controller;

determine a plurality of communication rates associated with the plurality of available wireless communication links;
determine a plurality of data transmission costs for the plurality of available wireless communication links;
determine a proportionate allocation of the plurality of available wireless communication links based upon the target communication rate, the plurality of communication rates associated with the plurality of available wireless communication links, and the plurality of data transmission costs for the plurality of available wireless communication links; and
execute, via the plurality of available wireless communication links, a plurality of concurrent wireless transmissions of the plurality of data packets based upon the proportionate allocation of the plurality of available wireless communication links to achieve the target communication rate.

2. The system of claim 1, wherein the instructions further comprise:
determine a plurality of data transmission times per packet for the plurality of available wireless communication links; and
determine the proportionate allocation of the plurality of available wireless communication links for the plurality of available wireless communication links based upon the target communication rate, the plurality of communication rates associated with the plurality of available wireless communication links, and the plurality of data transmission times per packet for the plurality of available wireless communication links.

3. The system of claim 1, wherein the instructions further comprise:
determine a plurality of data transmission times per packet for the plurality of available wireless communication links;
determine a plurality of data transmission costs for the plurality of available wireless communication links; and
determine the proportionate allocation of the plurality of available wireless communication links based upon the target communication rate, the plurality of communication rates associated with the plurality of available wireless communication links, the plurality of data transmission costs for the plurality of available wireless communication links, and the plurality of data transmission times per packet for the plurality of available wireless communication links.

4. The system of claim 1, wherein the plurality of available wireless communication links comprises a cellular communication link, a WiFi communication link, a LiFi communication link, a radiofrequency communication link, a VLC (video local area network) communication link, an electro-magnetic communication link.

5. The system of claim 1, wherein the instruction to determine the plurality of communication rates associated with the plurality of available wireless communication links comprises:
determine maximum communication rates associated with the plurality of available wireless communication links.

6. The system of claim 5, wherein the maximum communication rates associated with the plurality of available wireless communication links comprises a guaranteed bit rate for one of the plurality of available wireless communication links.

7. The system of claim 5, wherein the maximum communication rates associated with the plurality of available wireless communication links comprises a minimum best-effort bit rate for one of the plurality of available wireless communication links.

8. The system of claim 1, wherein the instruction includes:
execute, via the plurality of available wireless communication links, the plurality of concurrent wireless transmissions to uplink the plurality of data packets to the first controller based upon the proportionate allocation of the plurality of available wireless communication links to achieve the target communication rate.

9. The system of claim 1, wherein the instruction includes:
execute, via the plurality of available wireless communication links, the plurality of concurrent wireless transmissions to downlink the plurality of data packets from the first controller based upon the proportionate allocation of the plurality of available wireless communication links to achieve the target communication rate.

10. A method for multi-path data transmission, the method comprising:
determining a target communication rate for communicating a plurality of data packets between a first controller and a second controller;
identifying a plurality of available wireless communication links between the first controller and the second controller;
determining a plurality of communication rates associated with the plurality of available wireless communication links;
determining a plurality of data transmission costs for the plurality of available wireless communication links;
determining a proportionate allocation of the plurality of available wireless communication links based upon the target communication rate, the plurality of communication rates associated with the plurality of available wireless communication links, and the plurality of data transmission costs for the plurality of available wireless communication links; and
executing, via the plurality of available wireless communication links, a plurality of concurrent wireless transmissions of the plurality of data packets based upon the proportionate allocation of the plurality of available wireless communication links to achieve the target communication rate.

11. The method of claim 10, further comprising:
determining a plurality of data transmission times per packet for the plurality of available wireless communication links; and
determining the proportionate allocation of the plurality of available wireless communication links for the plurality of available wireless communication links based upon the target communication rate, the plurality of communication rates associated with the plurality of available wireless communication links, and the plurality of data transmission times per packet for the plurality of available wireless communication links.

12. The method of claim 10, further comprising:
determining a plurality of data transmission times per packet for the plurality of available wireless communication links;
determining a plurality of data transmission costs for the plurality of available wireless communication links;
determining a plurality of quality parameters for the plurality of available wireless communication links; and determining the proportionate allocation of the plurality of available wireless communication links for the plurality of available wireless communication links based upon the target communication rate, the plurality of communication rates, the plurality of data transmission costs, the plurality of quality parameters, and the plurality of data transmission times per packet for the plurality of available wireless communication links.

13. The method of claim 10, wherein the plurality of available wireless communication links comprises a cellular communication link, a WiFi communication link, a LiFi communication link, a radiofrequency communication link, VLC (video local area network) communication link, or an electro-magnetic communication link.

14. The method of claim 10, wherein determining the plurality of communication rates associated with the plurality of available wireless communication links comprises determining maximum communication rates associated with the plurality of available wireless communication links.

15. The method of claim 14, wherein the maximum communication rates associated with the plurality of available wireless communication links comprises a guaranteed bit rate for one of the plurality of available wireless communication links.

16. The method of claim 14, wherein the maximum communication rates associated with the plurality of available wireless communication links comprises a minimum best-effort bit rate for one of the plurality of available wireless communication links.

* * * * *